US008966857B2

(12) United States Patent
Pope et al.

(10) Patent No.: US 8,966,857 B2
(45) Date of Patent: Mar. 3, 2015

(54) SADDLE HANGER FOR A STRUCTURE

(75) Inventors: Paul Pope, Madison Lake, MN (US); Todd Grevious, Faribault, MN (US)

(73) Assignee: Mitek Holdings, Inc., Wilmington, DE (US)

( * ) Notice: Subject to any disclaimer, the term of this patent is extended or adjusted under 35 U.S.C. 154(b) by 0 days.

(21) Appl. No.: 13/114,789

(22) Filed: May 24, 2011

(65) Prior Publication Data
US 2012/0297724 A1 Nov. 29, 2012

(51) Int. Cl.
*E04C 3/02* (2006.01)
*E04B 1/26* (2006.01)

(52) U.S. Cl.
CPC ............. *E04B 1/2604* (2013.01); *E04B 1/2608* (2013.01); *E04B 1/2612* (2013.01)
USPC ................... 52/696; 52/289; 52/702; 52/715; 52/655.1; 403/232.1; 403/237

(58) Field of Classification Search
CPC ....... E04B 1/2612; E04B 1/2608; E04B 9/18; E04C 3/02
USPC ......................... 52/696, 289, 702, 715, 655.1; 403/232.1, 237
See application file for complete search history.

(56) References Cited

U.S. PATENT DOCUMENTS

| 1,146,223 | A | * | 7/1915 | Wiswell | 52/715 |
|---|---|---|---|---|---|
| 1,146,251 | A | * | 7/1915 | Harp | 52/715 |
| 1,945,925 | A | | 2/1934 | Stiefel | |
| 3,785,110 | A | * | 1/1974 | Galloway et al. | 52/715 |
| 4,115,970 | A | * | 9/1978 | Weinar | 52/506.07 |
| 4,198,175 | A | * | 4/1980 | Knepp et al. | 403/191 |
| 4,260,277 | A | * | 4/1981 | Daniels | 403/235 |
| 4,480,941 | A | * | 11/1984 | Gilb et al. | 403/232.1 |
| D293,416 | S | * | 12/1987 | Krueger | D8/373 |
| 5,190,268 | A | * | 3/1993 | Espinueva | 256/67 |
| 5,217,317 | A | * | 6/1993 | Young | 403/232.1 |
| 5,349,800 | A | * | 9/1994 | Peng | 52/506.06 |
| 5,457,928 | A | * | 10/1995 | Sahnazarian | 52/702 |
| 6,138,425 | A | * | 10/2000 | Wendt | 52/506.07 |
| 6,209,268 | B1 | | 4/2001 | Schmidt | |

(Continued)

FOREIGN PATENT DOCUMENTS

WO 2007/070924 A1 6/2007

OTHER PUBLICATIONS

USP Structural Connectors, USP Professional Design Manual and Product Catalog, 56th Edition, copyright 2011. "Perlin Hangers—JDS Series"—p. 105—admitted prior art.

(Continued)

*Primary Examiner* — Joshua J Michener
*Assistant Examiner* — Matthew Gitlin
(74) *Attorney, Agent, or Firm* — Senniger Powers LLP

(57) ABSTRACT

A saddle hanger for connecting at least one bracing member to a truss chord includes a base having a first end portion for receiving a bracing member and an adjacent portion for receiving a truss chord. A projecting element extends from a transverse edge of the base portion, and has a width narrower than the transverse dimension of the hanger base. A plurality of flanges extends upward from side edges of the base and defines with the base a channel for receiving one of the truss chord and bracing member. The saddle hanger can be formed from a stamped metal blank, with portions of the saddle hanger being nested in side-by-side relation to minimize the amount of material used.

20 Claims, 8 Drawing Sheets

(56) References Cited

U.S. PATENT DOCUMENTS

| | | | | |
|---|---|---|---|---|
| 6,332,299 | B1* | 12/2001 | Stewart, III | 52/696 |
| 6,446,409 | B1* | 9/2002 | Emerson | 52/712 |
| 6,837,019 | B2* | 1/2005 | Collie | 52/712 |
| 7,213,377 | B1* | 5/2007 | Sackett | 52/696 |
| 7,398,620 | B1* | 7/2008 | Jones | 52/92.2 |
| 7,503,148 | B2* | 3/2009 | Lin | 52/643 |
| 7,788,875 | B2* | 9/2010 | Wendt | 52/712 |
| D626,824 | S* | 11/2010 | Wood | D8/381 |
| 8,046,966 | B2* | 11/2011 | Moore et al. | 52/506.06 |
| 8,176,689 | B1* | 5/2012 | Thompson | 52/92.1 |
| 2004/0244328 | A1* | 12/2004 | Bak et al. | 52/712 |
| 2005/0086888 | A1 | 4/2005 | Moore et al. | |
| 2006/0059845 | A1* | 3/2006 | Visone | 52/702 |
| 2008/0060306 | A1* | 3/2008 | Platt et al. | 52/506.06 |
| 2008/0229680 | A1* | 9/2008 | Jahn et al. | 52/105 |
| 2008/0282641 | A1* | 11/2008 | Sackett | 52/715 |
| 2010/0146903 | A1* | 6/2010 | Ellis | 52/696 |

OTHER PUBLICATIONS

USP Structural Connectors, USP Professional Design Manual and Product Catalog, 56th Edition, copyright 2011. "Panel Hangers—KF & PHG Series"—p. 104—admitted prior art.

USP Structural Connectors, USP Professional Design Manual and Product Catalog, 56th Edition, copyright 2011. "Slant Nail Joist Hangers—HUS, JUS & MUS Series"—pp. 88, 90-94—admitted prior art.

USP Structural Connectors, USP Professional Design Manual and Product Catalog, 56th Edition, copyright 2011. "Roof Truss Ties—TR Series"—p. 176—admitted prior art.

Extended European Search Report dated Aug. 22, 2013 regarding European Application No. 12166711.7, 7 pages.

Published European Search Report dated Sep. 25, 2013 regarding European Application No. 12166711.7, 3 pages.

* cited by examiner

US 8,966,857 B2

SADDLE HANGER FOR A STRUCTURE

FIELD OF THE INVENTION

The present invention generally relates to connections for structures, and more specifically, a saddle hanger for connecting a truss chord and a bracing member.

BACKGROUND OF THE INVENTION

The use of trusses in the building of structures is commonplace. The bottom chords of trusses are often reinforced by bracing members, specifically by lateral bracing between adjacent trusses to transfer loads. The bottom chord of the truss and the bracing member are connected by connectors such as face mount clips or hangers. However, when the bracing members are loaded in tension, the clips or hangers offer low resistance to "pullout"; i.e., the bracing member pulls out of the clip connecting it to the bottom chord of the truss. As a solution to the weak tension resistance, a face mount clip can be combined with an additional tension tie to improve performance under tension. Using additional components, such as a tension tie, is not preferable, as it increases the cost and difficulty of manufacturing and installation.

SUMMARY OF THE INVENTION

In one aspect of the present invention, a saddle hanger for connecting at least one bracing member to a truss chord generally comprises a base having a first end portion sized and shaped for receiving an end of a bracing member thereon. An adjacent portion is sized and shaped for receiving the truss chord thereon. The base has opposite side edges extending from the first end portion to the adjacent portion. The first end portion has a transverse edge remote from the adjacent portion and extending between the side edges. The first end portion also has a projecting element with a width less than a distance between the opposite side edges at the first end portion. The projecting element projects outward from the remainder of the transverse edge of the first end portion. A plurality of flanges extends upward from the side edges of the base. At least some of the flanges define with the base a channel for receiving one of the truss chord and bracing member.

In another aspect of the present invention, a stamped metal blank for use in forming saddle hangers for connecting bracing members to truss chords generally comprises a first base section of a first saddle hanger. The first base section includes first and second end portions and a middle portion between the first and second end portions. A first cut in the blank defines a transverse edge of the first end portion and a projecting element of the first end portion projecting outward from the remainder of the transverse edge. The projecting element has fastening structure formed therein. A second base section of a second saddle hanger includes first and second end portions and a middle portion between the first and second end portions. The first cut in the blank defines a transverse edge of the second end portion of the second base section and a projecting element projecting outward from the remainder of the transverse edge. The projecting element of the second end portion of the second base section has fastening structure formed therein and is nested in side-by-side relation with the projecting element of the first base section of the first saddle hanger. A second cut in the blank partially defines flange sections of the first saddle hanger adapted to be bent upward from the first base section to form flanges of the first saddle hanger.

Other objects and features will be in part apparent and in part pointed out hereinafter.

BRIEF DESCRIPTION OF THE DRAWINGS

Corresponding reference characters indicate corresponding parts throughout the drawings.

DESCRIPTION OF THE PREFERRED EMBODIMENTS

Figure 1:
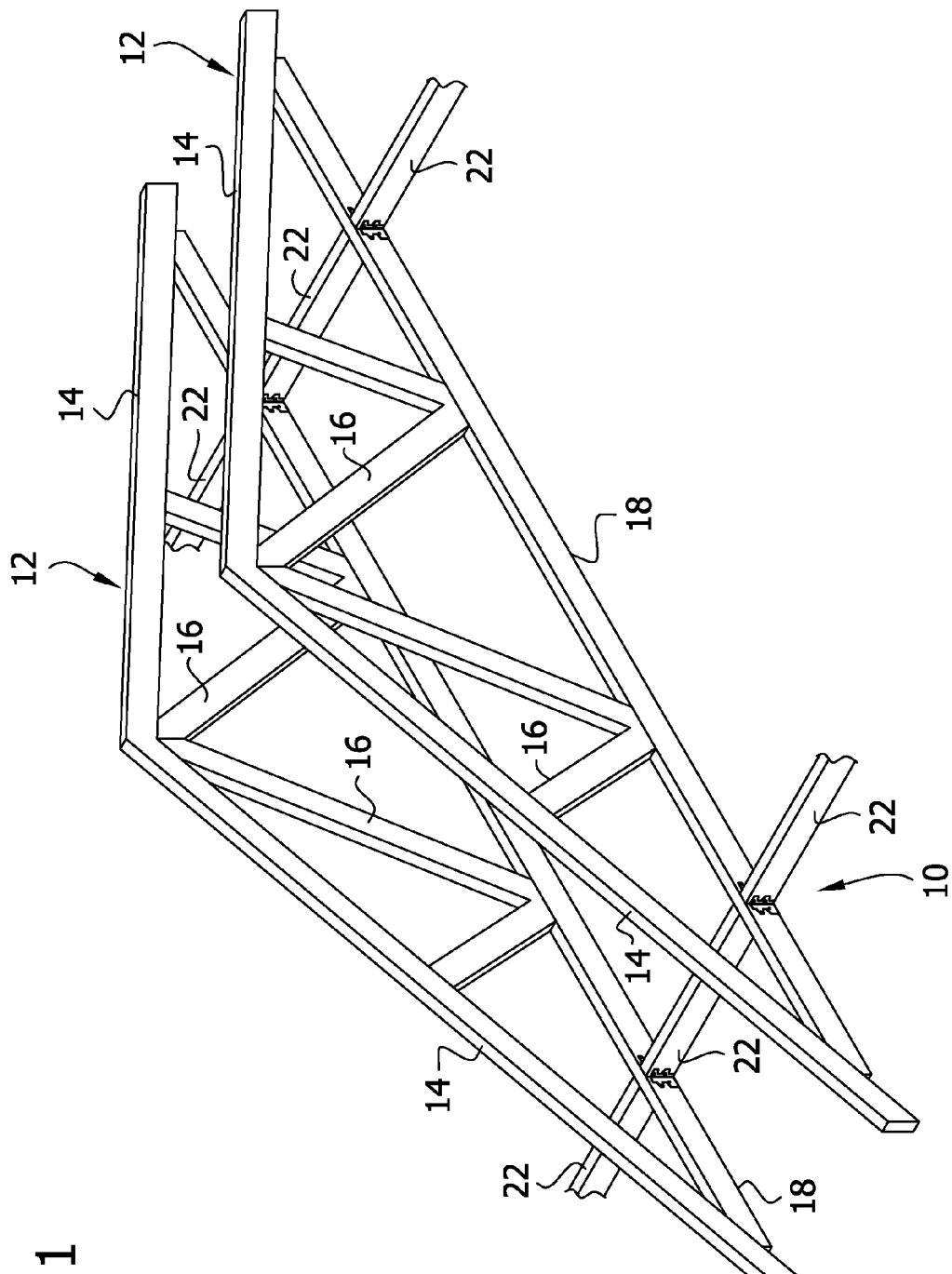
FIG. 1 is a perspective of adjacent trusses connected together by bracing members that are attached to the trusses by saddle hangers.
Figure 2:
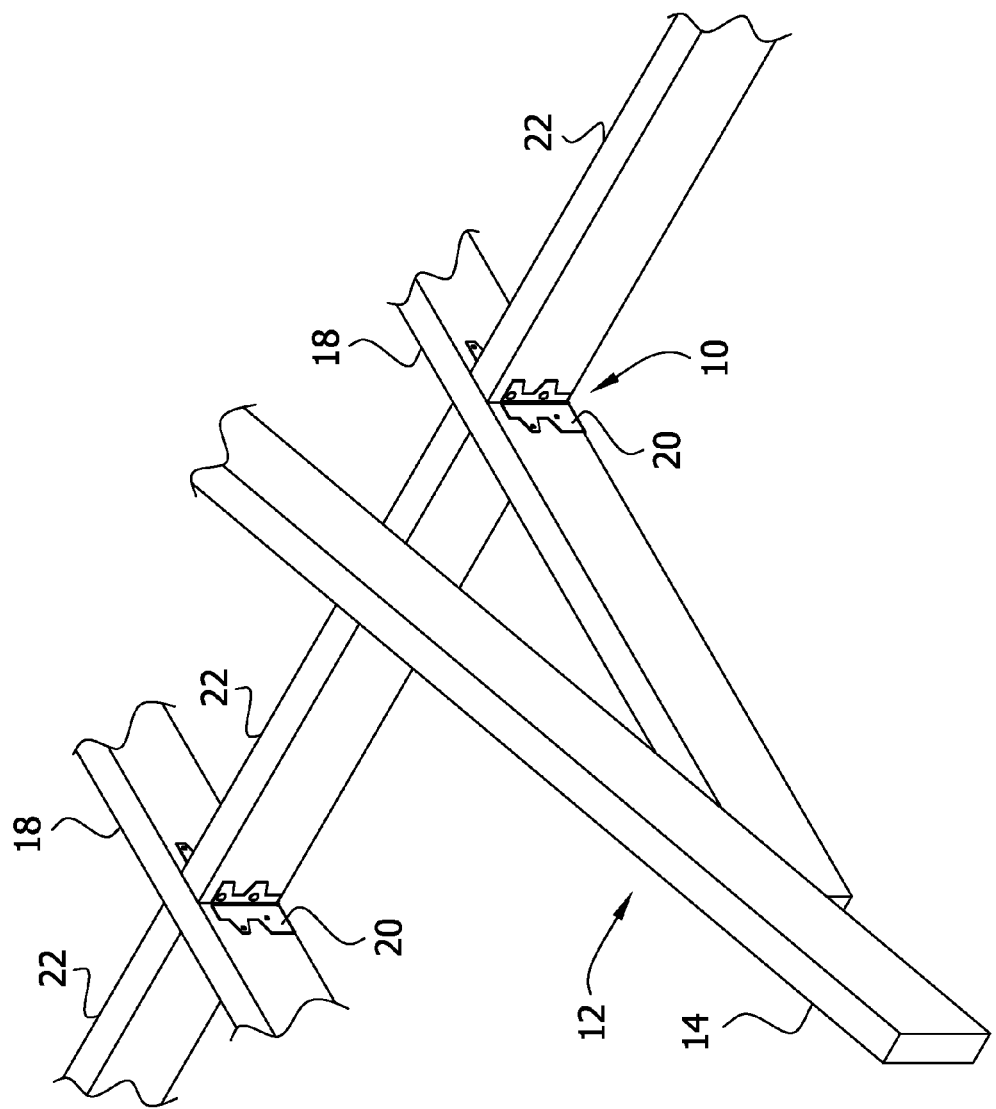
FIG. 2 is an enlarged fragmentary perspective of FIG. 1.
Figure 3:
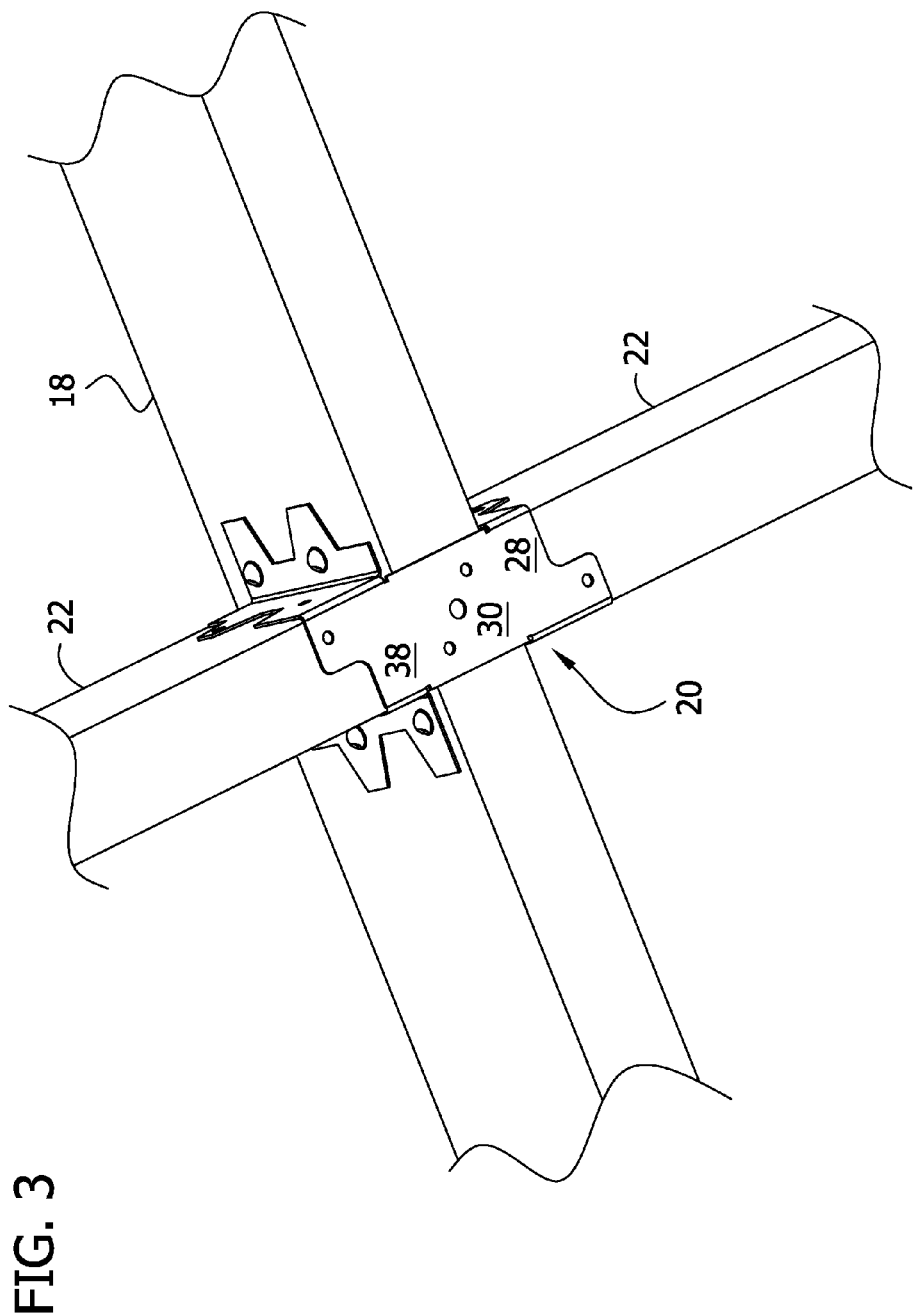
FIG. 3 is a further enlarged bottom perspective of one of the trusses at a location where the bracing members are connected to the truss by one of the saddle hangers.

Referring to FIGS. 1-3, a connection system for structures is shown generally at 10. Roof trusses generally indicated at 12 each include truss members (broadly, "wooden structural members") including upper chords 14, web members 16, and a bottom chord 18 joining the lower ends of the upper chords. The number and orientations of the web members 16 and chords 14, 18 may vary from the illustrated embodiment without departing from the scope of the invention, as a saddle hanger 20 according to the present invention is readily applicable to other truss configurations. Moreover, the saddle hanger 20 may be used in a structural support other than a roof truss.

For the purposes of this description, each piece of lumber incorporated as a truss member is of a rectangular cross section having two narrow sides and two wide sides. The lumber surfaces incorporating the two wide sides of the truss members will be called faces.

As seen in FIG. 1, two adjacent roof trusses 12 are connected to a lateral brace or bracing member 22. The bracing member 22 reinforces and stabilizes the trusses 12 and transfers loads between the trusses, as is known in the art. Two bracing members 22 are connected to the bottom chord 18 of each truss 12 by one of the saddle hangers 20 (see also FIGS. 2 and 3), as will be explained in further detail below.

Figure 4:
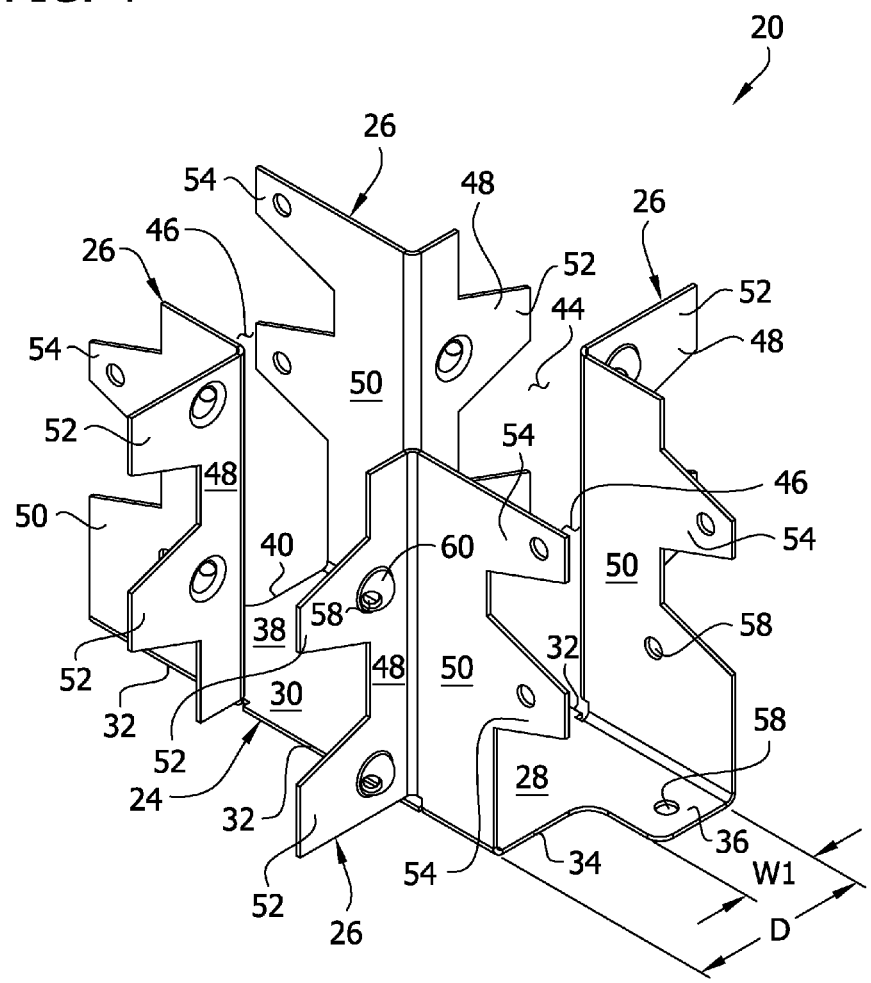
FIG. 4 is a perspective of a saddle hanger according to the present invention from a front and top vantage.
Figure 5:
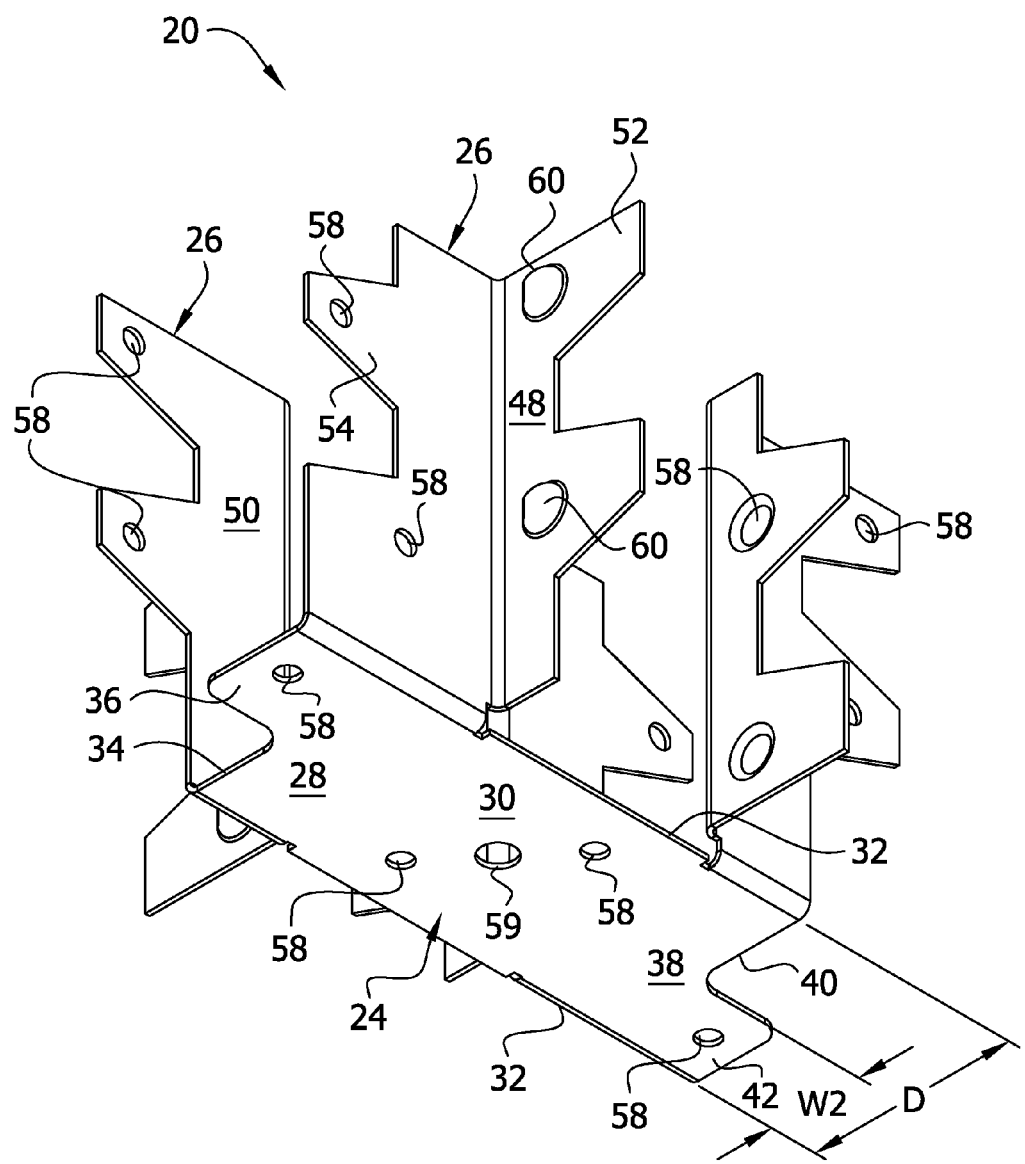
FIG. 5 is a bottom of the saddle hanger from a rear and bottom vantage.
Figure 6:
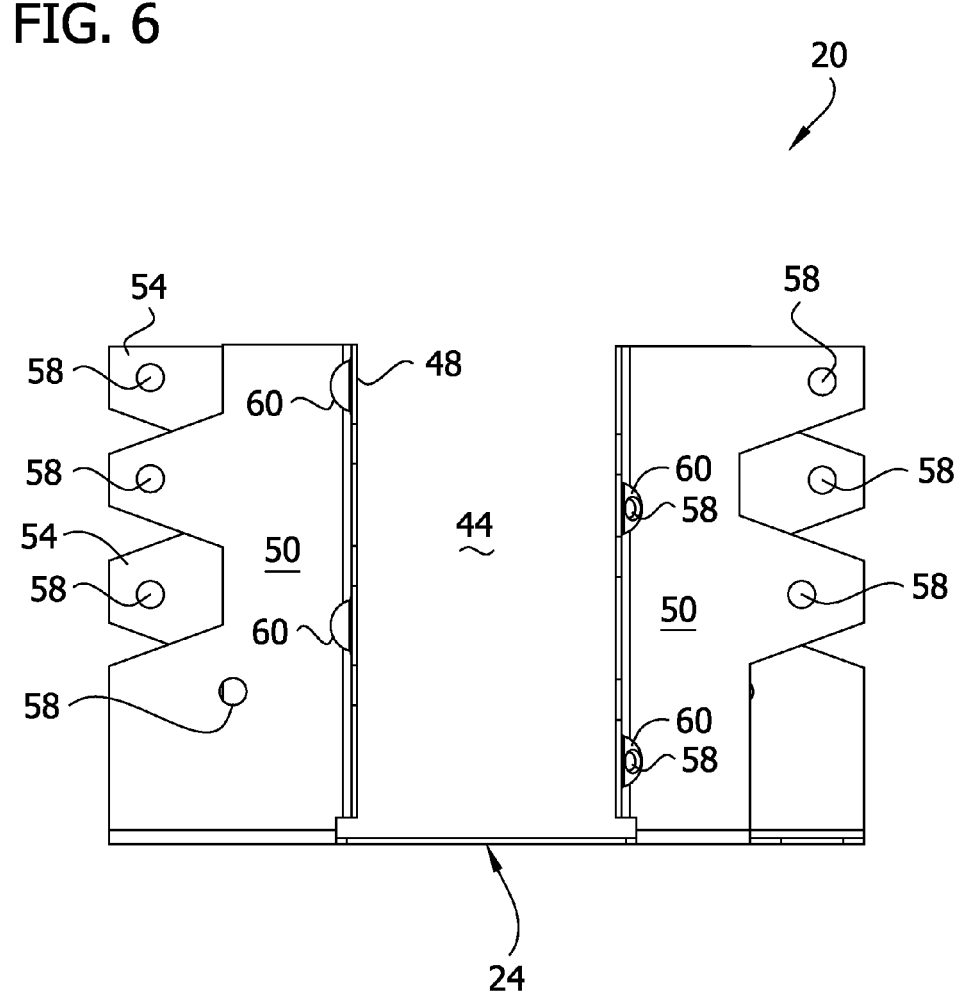
FIG. 6 is a side elevation thereof.

Referring to FIGS. 4-6, the saddle hanger 20 includes a base 24 and a plurality of flanges 26. The base 24 has a first end portion 28 and a middle portion 30 (broadly, "an adjacent portion"). Opposite side edges 32 extend from the first end portion 28 to the middle portion 30. The first end portion 28 is sized and shaped to receive a bracing member 22, and the middle portion 30 is sized and shaped to receive a truss chord, for example bottom chord 18 (see FIG. 3). The first end portion 28 has a transverse edge 34 extending from one of the opposite side edges 32 to the other at a location remote from the middle portion 30. The transverse edge 34 is on a side of the first end portion 28 opposite the middle portion 30.

A projecting element 36 projects outward in a direction parallel to the side edges 32 from the remainder of the transverse edge 34. The projecting element 36 has a width W1 that is less than a distance D between the opposite side edges 32 of the base 24 at the first end portion 28. More specifically, the projecting element 36 does not span the entire length of the transverse edge 34. In the illustrated embodiment, the projecting element 36 is generally rectangular in shape, and the transverse edge 34 intersects the projecting element at a generally right angle. However, the projecting element can have other shapes within the scope of the present invention. The projecting element 36 of the first end portion 28 is disposed adjacent one of the side edges 32 of the base 24. Other locations of the projecting element are within the scope of the present invention.

As illustrated, the base 24 can include a second end portion 38 extending from the middle portion 30 in a direction opposite to the first end portion 28. The second end portion 38 is sized and shaped to receive another bracing member 22, which is connected to the bottom chord 18 on the opposite face from the bracing member received in the first end portion 28 (see FIG. 3). The opposite side edges 32 of the base 24 extend along the second end portion 38. The second end portion 38, like the first end portion 28 described above, has a transverse edge 40 extending from one of the side edges 32 to the other. The transverse edge 40 is on the side of the second end portion 38 that is opposite the middle portion 30.

A projecting element 42 projects outward from the remainder of the transverse edge 40. Referring to FIG. 5, the projecting element 42 has a width W2 that is less than a distance D between the opposite side edges 32 of the base 24 at the second end portion 38. More specifically, the projecting element 42 does not span the entire length of the transverse edge 40. In the illustrated embodiment, the projecting element 42 is generally rectangular in shape, and the transverse edge 40 intersects the projecting element at a generally right angle. However, the projecting element can have other shapes within the scope of the present invention. The projecting element 42 of the second end portion 38 is disposed adjacent one of the side edges 32 of the base 24. Other locations of the projecting element are within the scope of the present invention.

In the illustrated embodiment, the projection element 36 of the first end portion 28 is offset from the projecting element 42 of the second end portion 38. Preferably, the projecting elements 36, 42 are laterally offset from each other. In the illustrated embodiment, the projecting element 36 is disposed adjacent one of the side edges 32, and the projecting element 42 is disposed adjacent the other side edge. Other configurations are within the scope of the present invention.

Flanges 26 extend upward from the opposite side edges 32 of the base 24. The saddle hanger 20 can include any number and configuration of flanges 26. In a preferred embodiment, the saddle hanger includes four flanges 26, which are disposed on the side edges 32 adjacent respective transverse edges 34, 40. The flanges 26 and the base 24 together form a channel for receiving the bottom chord 18 and a channel for receiving the bracing member 22. More specifically, the flanges 26 and the base 24 define a truss channel 44 extending transversely of the base and sized and shaped to receive the bottom chord 18, and a bracing member channel 46 extending parallel to the side edges of the base and sized and shaped to receive the bracing member 22. In the illustrated embodiment, the flanges 26 and the base 24 form two bracing member channels 46, facilitating the attachment of two bracing members 22 to the truss bottom chord 18 on opposing faces of the truss bottom chord (see FIG. 3).

In the illustrated embodiment, each flange 26 includes a truss connection portion 48 and a bracing member connection portion 50 extending generally perpendicular to the truss connection portion. The bracing member connection portion 50 extends upward from and along the side edge 32 of the base 24, and the truss connection portion 48 extends from the bracing member connection portion in a direction away from the base. However, other configurations are within the scope of the present invention. As illustrated, the bracing member connection portions 50 of the flanges 26 located on the first end portion 28 of the base 24 form a bracing member channel 46 with the base. Likewise, the bracing member connection portions 50 of the flanges 26 located on the second end portion 38 of the base 24 form another bracing member channel 46 with the base. The truss connection portions 48 of each of the four flanges 26 in the illustrated embodiment form the truss channel 44 with the base 24.

The truss connection portion 48 of each flange 26 includes tabs 52, and the bracing member connection portion 50 of each flange includes tabs 54. Preferably, the tabs 52 of each one of the truss connection portions 48 located on the first end portion 28 are offset from the tabs 52 of the opposing truss connector portions located on the second end portion 38. Preferably, the tabs 54 of the bracing member connection portions 50 located on one side edge 32 of the base 28 are offset from the tabs 54 of respective ones of the bracing member connection portions located on the other side edge 32 of the base. The offset of the tabs ensures that the fastening members, as described below, are offset to provide clearance for nails received through the flanges 26 and reduce the metal content of the hanger 20. The offset of the tabs provides the further benefit of allowing nesting of the flanges, as well as nesting of multiple saddle hangers, during manufacturing, as described below.

The saddle hanger 20 further includes fastening structure for use in attaching the saddle hanger to the wooden structural members. Fastening structure can be of any type known in the art for attaching a connector to a wooden structural member, such as nailing teeth (not shown) struck from the material of the hanger. In the illustrated embodiment, the fastening structure comprises a hole to allow for insertion of a fastening member (not shown). More specifically, in one embodiment the fastening structure comprises a nail hole 58, and the fastening member comprises a nail (not shown).

While other configurations of nail holes 58 are within the scope of the present invention, the illustrated embodiment includes nail holes on both the base 24 and the flanges 26. More specifically, the base 24 includes at least one nail hole 58 in each of the first end, middle, and second end portions 28, 30, 38. Preferably, the base 24 includes two nail holes 58 in the portion 30 to facilitate driving nails into the bottom surface of the bottom chord 18. The middle portion 30 of the base 24 can also include a pilot hole 59 for tooling. The pilot hole for tooling can be omitted or in a different location within the scope of the present invention. As illustrated, the base 24 includes one nail hole 58 in the first end portion 28 to facilitate driving a nail into the bottom surface of a bracing member 22. Likewise, the base 24 includes one nail hole 58 in the second end portion 38 to facilitate driving a nail into the bottom surface of another bracing member 22 attached on an opposing face of the truss. Preferably, each of the nail holes 58 on the first and second end portions 28, 38 are located on the respective projecting element 36, 42.

By locating the nail holes 58 in the projecting elements 36, 42, the bracing members 22 are less likely to split, particularly when loaded in tension. The nail holes 58 in the projecting elements 36, 42 are located far enough from the truss channel 44 so that nails driven through the holes in to respective bracing members 22 will enter the bracing members a significant distance from their ends abutting the bottom chord 18.

This leaves enough wood between the nail and the end of the bracing member 22 abutting the bottom chord 18 to avoid splitting the bracing member. At the same time minimal steel is employed to achieve this result.

In the illustrated embodiment, each of the flanges 26 also includes nail holes 58 to facilitate driving nails into the faces of the wooden structural members. However, it is within the scope of the invention that some of the flanges 26 do not have fastening structure associated therewith.

As shown, each of the flanges 26 includes nail holes 58 on both the truss connection portion 48 and the bracing member connection portion 50. The nail holes 58 located on the bracing member connection portion 50 are located on the bracing member connection portion tabs 54. The nail holes 58 on the bracing member connection portion 50 of the flange 26 located on a side edge 32 in the first end portion 28 are offset from the nail holes 58 on the bracing member connection portion 50 of the flange 26 located on the opposite side edge 32 in the first end portion. Likewise, the nail holes 58 on the bracing member connection portion 50 of the flange 26 located on a side edge 32 in the second end portion 38 are offset from the nail holes 58 on the bracing member connection portion 50 of the flange 26 located on the opposite side edge 32 in the second end portion 38. This offset prevents the nails inserted through the nail holes 58 and into the bracing member 22 from being aligned.

Similarly, the nail holes 58 on the truss connection portion 48 are located on the truss connection portion tabs 52. The nail holes 58 on the truss connection portion 48 of a flange 26 located on a side edge 32 in the first end portion 28 are offset from the nail holes 58 on the truss connection portion 48 of a flange 26 located on the same side edge 32 in the second end portion 38. This offset prevents the nails inserted through the nail holes 58 and into the bottom chord 18 from being aligned. As illustrated, the nail holes 58 located on the truss connection portion 48 of each flange 36 are configured to guide nails through the nail holes at different angles. More specifically, the nail holes 58 on the truss connection portion 48 of each flange 26 are located on a dome portion 60 of the truss connection portion. The location of the nail hole 58 on the domed portion 60 is such that a nail would be driven at an angle to the plane of the truss connection portion 48 and the face of the bottom chord 18.

In use, a truss member, e.g. truss bottom chord 18, is positioned in the truss channel 44 of the saddle hanger 20 (see FIG. 3). A bracing member 22 is positioned in each of the bracing member channels 46 of the saddle hanger 20. The saddle hanger is then fastened to the wooden structural members by any suitable means, thereby securing the wooden structural members to each other. Particularly, nails are inserted through each of the nail holes 58 located on the base 24 and the flanges 26 to secure the saddle hanger 20 to the bottom chord 18 and the bracing members 22.

Figure 7:
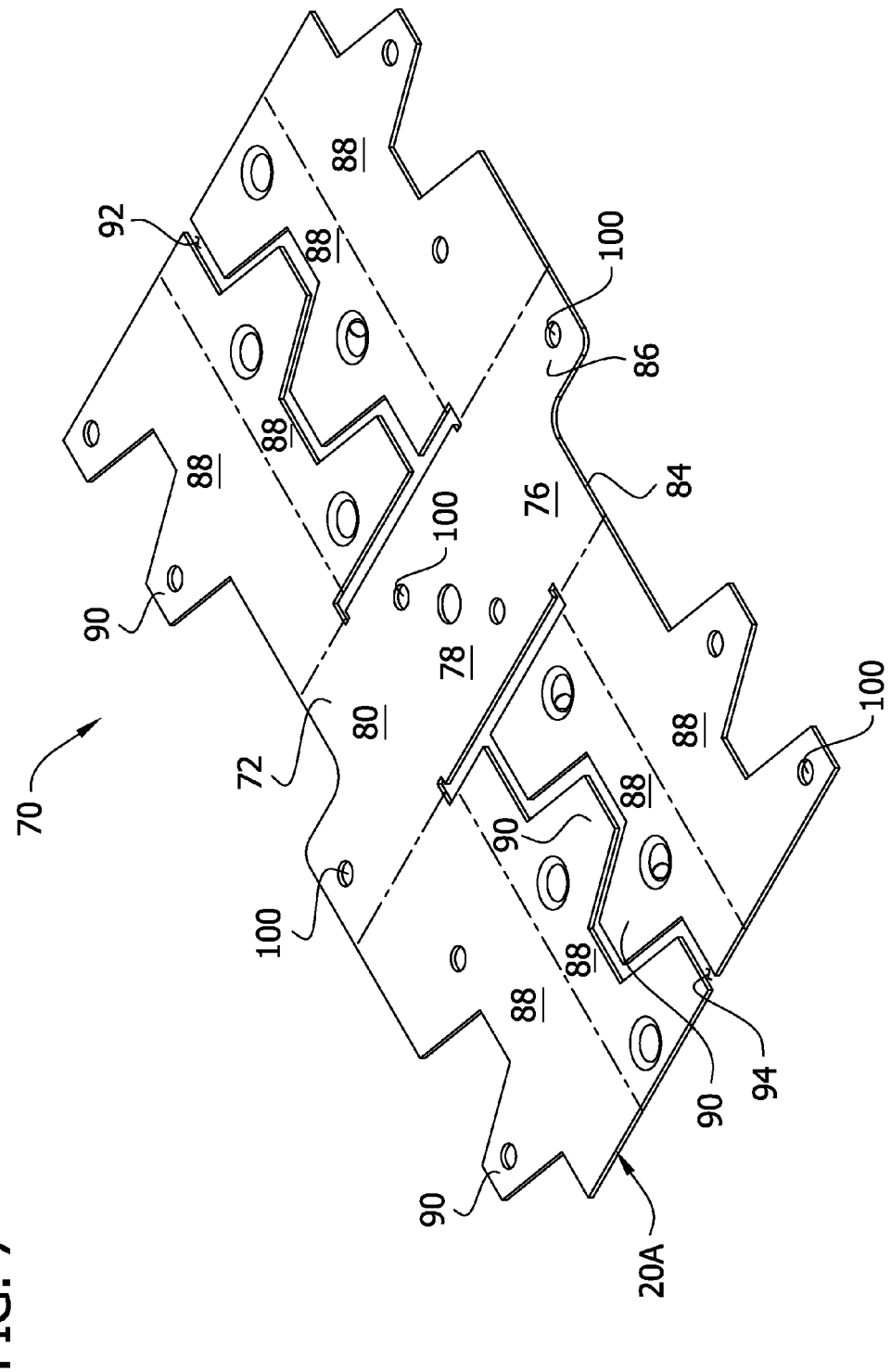
FIG. 7 is a perspective of a stamped metal blank for forming a single saddle hanger according to the present invention.
Figure 8:
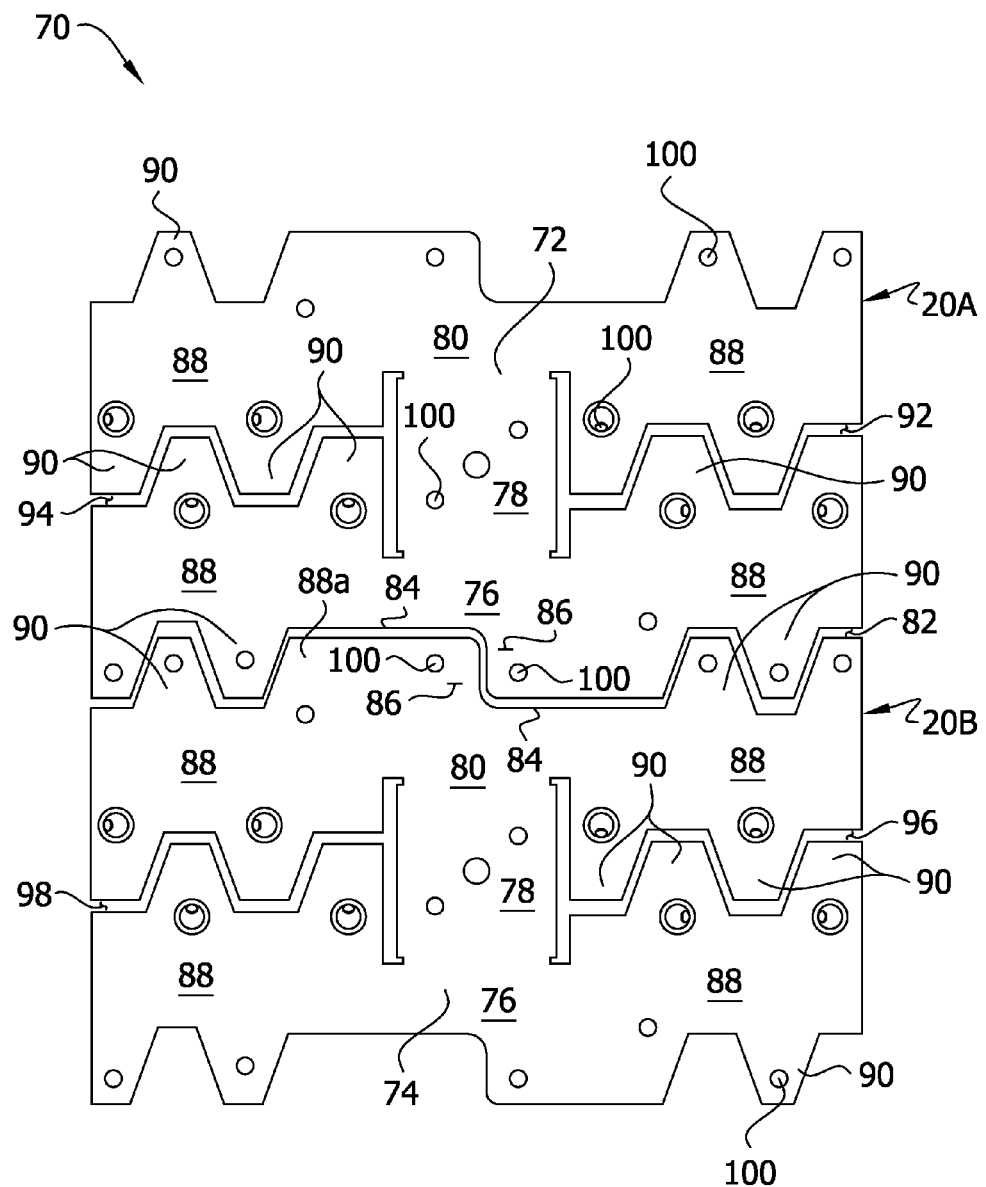
FIG. 8 is a top view of a stamped metal blank for forming two saddle hangers in nesting arrangement according to the present invention.

Referring to FIGS. 7 and 8, a saddle hanger 20 as described above can be formed as a stamped metal blank 70 that is bent into shape. As illustrated, the stamped metal blank 70 can be used to form one saddle hanger 20 (see FIG. 7), or multiple saddle hangers (see FIG. 8). Any number of saddle hangers 20 can be formed from the stamped metal blank 70.

As seen in FIG. 8, the stamped metal blank 70 includes a first base section 72 of a first saddle hanger 20A and a second base section 74 of a second saddle hanger 20B. Each of the base sections 72, 74 includes a first end portion 76, a middle portion 78, and second end portion 80. The middle portion 78 is located between the first and second end portions 76, 80. A first cut 82 in the blank 70 defines a transverse edge 84 of the first end portion 76 of the first base section 72, which corresponds to a transverse edge 34 or 40 of the formed saddle hanger 20 described above. The first cut 82 further defines a projecting element 86 of the first end portion projecting outward from the remainder of the transverse edge 84, which corresponds to a projecting element 36 or 42 of the formed saddle hanger 20. As shown in FIG. 8, the first cut 82 also defines a transverse edge 84 and a projecting element 86 of the second end portion 80 of the second base section 74, which will respectively form a transverse edge 34 or 40 and a projecting element 36 or 42 of a second saddle hanger 20. The projecting elements 86 of the first and second base portions 74, 76 formed by the first cut 82 are nested in side-by-side relation.

The first cut 82 also partially defines flange sections 88 of both the first and second saddle hangers 20A, 20B. More specifically, the first cut 82 defines a tab 90 on a flange section 88 of the first saddle hanger 20A, which corresponds to a tab 52 or 54 of a formed saddle hanger 20, and defines a tab 90 on a flange section 88 of the second saddle hanger 20B, which corresponds to a tab 52 or 54 of another formed saddle hanger 20. The tabs 90 of the first and second saddle hangers 20A, 20B defined by the first cut 82 are nested together in side-by-side relation. In the illustrated embodiment, one nested portion of a flange section 88 of the first saddle hanger 20A is immediately adjacent to the projecting element 86 of the first end portion 76 of the first base section 72. Likewise, one nested portion 88a of a flange section 88 of the second saddle hanger 20B is immediately adjacent to the projecting element 86 of the second end portion 80 of the second base section 74.

A second cut 92 in the blank 70 partially defines two flange sections 88 of the first saddle hanger 20A, which are adapted to be bent upward from the first base section 72 to form flanges 26 of a saddle hanger 20. The second cut 92 defines tabs 90 on each of the two flange sections 88, which are nested together in side-by-side relation. Similarly, a third cut 94 in the blank 70 partially defines two flange sections 88 of the first saddle hanger 20A, which are adapted to be bent upward from the first base section 72 to form flanges 26 of a saddle hanger 20. The third cut 94 defines tabs 90 on each of the two flange sections 88, which are nested together in side-by-side relation.

A fourth cut 96 in the blank 70 partially defines two flange sections 88 of the second saddle hanger 20B, which are adapted to be bent upward from the second base section 74 to form flanges 26 of another saddle hanger 20. The fourth cut 96 defines tabs 90 on each of the two flange sections 88, which are nested together in side-by-side relation. Similarly, a fifth cut 98 in the blank 70 partially defines two flange sections 88 of the second saddle hanger 20B, which are adapted to be bent upward from the second base section 74 to form flanges 26 of a saddle hanger 20. The fifth cut 98 defines tabs 90 on each of the two flange sections 88, which are nested together in side-by-side relation.

The stamped metal blank 70 further includes fastening structure corresponding to the fastening structure of the formed saddle hanger 20. More specifically, in the illustrated embodiment, the blank 70 includes nail holes 100 corresponding to the nail holes 58 of the formed saddle hanger 20. More specifically, the blank 70 includes nail holes 100 in each flange section 88 and in the first end portion 76, middle portion 78, and second end portion 80 of each base section 72, 74. The projecting elements 86 each include a nail hole 100, as do each of the tabs 90. The nail holes 100 can be configured to guide the nails through the nail holes at an angle to the flange sections 88, as described above.

The nesting relationship of both the flange sections 88 and the first and second saddle hangers 20A, 20B in the blank 70 allows the saddle hangers to be manufactured using as little material as possible. The saddle hanger 20 (and blank 70) can be made of any suitable material as is known in the art. In one embodiment, the saddle hanger 20 is made of galvanized steel. The cuts, and in particular the first cut 82 is shown as being continuous and completely separating the saddle hanger 20A from saddle hanger 20B. It will be understood that connecting tabs (not shown) may remain after the cut so that the unformed saddle hangers 20A, 20B in the blank 70 can be handled as a single piece. The connecting tabs could be broken or stamped out at a later stage in the forming process.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products without departing from the scope of the invention, it is intended that all matter contained in the above description and shown in the accompanying drawings shall be interpreted as illustrative and not in a limiting sense.

What is claimed is:

1. A saddle hanger for connecting at least one bracing member to a truss chord, the saddle hanger comprising:
    a base having a first end portion sized and shaped for receiving an end of a bracing member thereon, and an adjacent portion co-planar with the first end portion, the adjacent portion being sized and shaped for receiving the truss chord thereon, the base having opposite side edges extending from the first end portion to the adjacent portion, the first end portion having a transverse edge remote from the adjacent portion and extending between the side edges, a projecting element having a width less than a distance between the opposite side edges at the first end portion and projecting outward from the remainder of the transverse edge of the first end portion, and, wherein the projecting element reduces the likelihood of splitting of the bracing member when connected thereto; and
    a plurality of flanges integral with the base and extending upward from the side edges of the base, each of the plurality of flanges comprising a bracing member connection portion and a truss connection portion integral with and extending from the bracing member connection portion at an angle, at least some of the flanges defining with the base a channel for receiving one of the truss chord and bracing member.

2. A saddle hanger as set forth in claim 1 wherein the projecting element includes fastening structure for use in attaching the saddle hanger to the brace.

3. A saddle hanger as set forth in claim 2 wherein the fastening structure comprises a nail hole.

4. A saddle hanger as set forth in claim 1 wherein the base further comprises a second end portion co-planar with and extending from the adjacent portion in a direction opposite to the first end portion, the second end portion being sized and shaped to receive another bracing member thereon, the opposite side edges of the base extending along the second end portion, the second end portion having a transverse edge remote from the adjacent portion and extending between the side edges and a projecting element having a width less than that of a distance between the opposite side edges at the second end portion and projecting outward from the remainder of the transverse edge of the second end portion.

5. A saddle hanger as set forth in claim 4 wherein the projecting element of the second end portion includes fastening structure for use in attaching the saddle hanger to the brace.

6. A saddle hanger as set forth in claim 5 wherein the fastening structure of the projecting element of the second end portion includes a nail hole.

7. A saddle hanger as set forth in claim 4 wherein the base has a longitudinal axis extending parallel to the side edges, and the projecting elements of the first and second end portions are positioned on opposite sides of the longitudinal axis.

8. A saddle hanger as set forth in claim 7 wherein the projecting element of the first end portion is disposed adjacent one of the side edges of the base and the projecting element of the second end portion is disposed adjacent to the other of the side edges of the base.

9. A saddle hanger as set forth in claim 8 wherein each projecting element is generally rectangular in shape, each of the transverse edges intersecting a respective one of the projecting elements generally at right angles therewith.

10. A saddle hanger as set forth in claim 4 wherein the flanges and base define a truss channel extending transversely of the base and bracing member channels extending parallel to the side edges of the base.

11. A saddle hanger as set forth in claim 10 wherein opposing truss connection portions include tabs that are offset from the tabs on the opposing truss connection portion, and opposing brace connection portions include tabs that are offset from the tabs on the opposing brace connection portion.

12. A saddle hanger as set forth in claim 10 wherein at least some of the truss connection portions and brace connection portions of the flanges have fastening structure associated therewith.

13. A saddle hanger as set forth in claim 12 wherein the fastening structure comprises a nail hole, the nail holes of the truss connection portions being configured for guiding nails at angles through the nail holes.

14. A stamped metal blank for use in forming saddle hangers for connecting bracing members to truss chords, the stamped metal blank comprising:
    a first base section of a first saddle hanger, the first base section including first and second end portions and a middle portion between the first and second end portions, the first end portion, second end portion, and middle portion being co-planar;
    a first cut in the blank defining a transverse edge of the first end portion and a projecting element of the first end portion projecting outward from the remainder of the transverse edge, the projecting element having fastening structure formed therein;
    a second base section of a second saddle hanger, the second base section including first and second end portions and a middle portion between the first and second end portions, the first end portion, second end portion, and middle portion being co-planar;
    the first cut in the blank defining a transverse edge of the second end portion of the second base section and a projecting element projecting outward from the remainder of the transverse edge, the projecting element of the second end portion of the second base section having fastening structure formed therein and being nested in side-by-side relation with the projecting element of the first base section of the first saddle hanger wherein the projecting elements of the first and second end portions reduce the likelihood of splitting of the bracing members when connected thereto;

a second cut in the blank partially defining flange sections of the first saddle hanger adapted to be bent upward from the first base section to form flanges of the first saddle hanger integral with the first base section and having a bracing member connection portion and a truss connection portion integral with and extending from the bracing member connection portion.

15. A stamped metal blank as set forth in claim 14 wherein the fastening structure of the projecting elements of the first end portions of the first and second saddle hangers comprises nail holes.

16. A stamped metal blank as set forth in claim 14 wherein the first cut partially defines flange sections of the first and second saddle hangers, a portion of the flange section of the second saddle hanger being nested in side-by-side relation with a portion of the flange section of the first saddle hanger.

17. A stamped metal blank as set forth in claim 16 wherein the nested portion of the flange section of the second saddle hanger is immediately adjacent to the projecting element of the second saddle hanger.

18. A stamped metal blank as set forth in claim 17 wherein the first cut further defines a tab on one of the flange sections of the first saddle hanger and defines a tab on one of the flange sections on the second saddle hanger, the tabs being nested together in side-by-side relation.

19. A stamped metal blank as set forth in claim 14 wherein the second cut defines tabs on the flange sections of the first saddle hanger, the tabs being nested together in side-by-side relation.

20. A stamped metal blank as set forth in claim 19 further comprising nail holes formed in the flange sections to guide nails through the nail holes at an angle to the respective flange sections.

* * * * *